United States Patent [19]

Kubota

[11] Patent Number: 4,633,757
[45] Date of Patent: Jan. 6, 1987

[54] BRAKE BOOSTER

[75] Inventor: Hitoshi Kubota, Minami-ashigara, Japan

[73] Assignee: Nissan Motor Company, Limited, Yokohama, Japan

[21] Appl. No.: 655,683

[22] Filed: Sep. 28, 1984

[30] Foreign Application Priority Data

Oct. 5, 1983 [JP] Japan ................... 58-186500

[51] Int. Cl.⁴ .................................... F15B 13/04
[52] U.S. Cl. ........................... 91/32; 60/545;
   60/547.1; 91/33; 91/369 A; 91/450; 91/459
[58] Field of Search ............. 91/6, 32, 450, 275,
   91/361, 459, 33, 369 A; 60/545, 547.1;
   137/627.5

[56] References Cited

U.S. PATENT DOCUMENTS

| | | | |
|---|---|---|---|
| 2,959,012 | 11/1960 | Johnson | 60/545 |
| 3,222,999 | 12/1965 | Hager | 91/434 |
| 3,364,818 | 1/1968 | Hager | 91/32 |
| 3,371,484 | 3/1968 | Julow | 60/545 |
| 3,460,439 | 8/1969 | Cripe | 91/32 |
| 3,559,532 | 2/1971 | MacDuff | 91/33 |
| 3,831,489 | 8/1984 | Woo | 91/32 |
| 3,871,497 | 3/1975 | Bessiere | 60/545 |
| 4,117,769 | 10/1978 | Carre et al. | 91/170 |
| 4,287,811 | 9/1981 | Katagiri et al. | 91/369 |
| 4,395,883 | 8/1983 | Melinat | 60/545 |

Primary Examiner—Abraham Hershkovitz
Attorney, Agent, or Firm—Schwartz, Jeffery, Schwaab, Mack, Blumenthal & Evans

[57] ABSTRACT

A brake booster can switch operating mode from a positive-pressure mode using a signal-controlled fluid pressure supplier to a vacuum-pressure mode and vice versa. The booster includes a booster converter holding both an air valve and a vacuum valve of the booster closed in the positive-pressure mode or holding the booster air valve in its closed and open positions while holding the booster vacuum valve in its open and closed positions respectively when the brake pedal is released and depressed in the vacuum mode. The fluid pressure supplier is enabled while both booster valves are in the closed position in the positive-pressure mode.

10 Claims, 5 Drawing Figures

BRAKE BOOSTER

BACKGROUND OF THE INVENTION

The present invention relates to a brake booster for vehicles, particularly automotive vehicles.

The present inventor first presented the following invention of a brake booster system in Japanese Patent Application No. 58-186498, filed on Oct. 5, 1983.

Referring to FIG. 1, this brake booster system will be briefly described hereinafter. The system comprises a sensor 1 sensing the depression force applied to a brake pedal 2 by an operator and outputting a corresponding depression force signal (a), a sensor 3 directly or indirectly sensing the rate of deceleration of the a vehicle due to braking, and outputting a corresponding actual deceleration signal (b), a booster 5 arranged between the brake pedal 2 and a master brake cylinder 4 and including a reference fluid pressure chamber 5a connected to atmosphere and a working fluid pressure chamber 5b both defined within a power cylinder 5c by a movable wall 5d having a peripheral, flexible diaphragm 5e, a fluid pressure source 6 communicating with the working pressure chamber 5b, an electromechanical valve 7 provided intermediate a conduit 8 communicating the working fluid pressure chamber 5b to the fluid pressure source 6 or to atmosphere and actuated by means of a valve-control signal (c) so as to match the actual deceleration to a target deceleration value, a function generator 9 outputting a target deceleration signal (d) in accordance with the depression force signal (a), and a comparator 10 receiving the target deceleration signal (d) and the actual deceleration and outputting the valve-control signal (c).

The brake booster system operates as follows: The foot of the operator applies a force to the brake pedal 2. Thus, the function generator 9 outputs a corresponding target deceleration signal (d) depending on a depression force signal (a) from the depression force sensor 1 and at the same time the deceleration sensor 3 outputs a corresponding actual deceleration signal (b). The comparator 10 receives the target deceleration signal (d) and the actual deceleration signal (b) and outputs a corresponding valve-control signal (c). The electro-mechanical valve 7 is actuated by means of the valve-control signal (c), thus supplying a suitable fluid pressure from the fluid pressure source 6 or from atmosphere to the working pressure chamber 5b.

Thus, a desired braking force is achieved. In accordance with the above-described brake booster system, equal brake pedal depression forces can effect equal target decelerations, even if the weights of vehicles having the above-described brake booster system may differ.

Since the brake booster system of FIG. 1 which uses a fluid pressure source 6 other than the vacuum from the intake manifold supplies a desired fluid pressure to the working fluid pressure chamber side of the movable wall 5d by way of the electro-mechanical valve 7, the booster 5 can employ a structure in which the fluid pressure chambers 5a and 5b are separated by the movable wall 5d without providing a booster valve arrangement between the fluid pressure chambers 5a and 5b and can obviate a well-known vacuum-type booster structure. Thus, in the novel system when the part of the system supplying fluid pressure from the fluid pressure source 6 to the working fluid pressure chamber 5b encounters any difficulty, the booster 5 may malfunction or become altogether inoperative, so that the desired or any braking force at all may not be achieved.

SUMMARY OF THE INVENTION

An object of the present invention is to provide a brake booster which can switch its operating mode from a positive-pressure mode employing a fluid pressure source, which may simply be atmosphere, to a vacuum mode and vice versa. In order to accomplish this object, the brake booster includes a pressure-differential responsive movable wall dividing the interior of a power cylinder into first and second fluid pressure chambers, first valve means for controlling connection between the second fluid pressure chamber and atmosphere, second valve means for controlling connection between the two chambers, a booster converter concurrently holding both the valve means in their closed positions when in the positive-pressure mode or holding only one of the first valve means and the second valve means in the closed position in the vacuum-pressure mode, and means for supplying fluid pressure to the second fluid pressure chamber in response to a control signal in the positive-pressure mode.

Another object of the present invention is to provide a brake booster which can automatically convert operating mode from positive- or atmospheric-pressure-mediated control to vacuum control. In order to accomplish this object, the brake booster additionally includes a booster converter comprising a booster converter body opening and closing the second valve means, and a solenoid driving the booster converter body, and a control unit containing a solenoid-control circuit which, in response to a trouble signal in the fluid pressure source, outputs a signal actuating the solenoid so that the booster converter body allows only one of the first valve means and the second valve means to be closed at one time.

Other objects or advantages of the present invention will be apparent from the following description, claims and accompanying drawings.

DESCRIPTION OF THE PREFERRED EMBODIMENTS

The present invention will be described in terms of preferred embodiments of a brake booster for an automotive vehicle.

Figure 2:
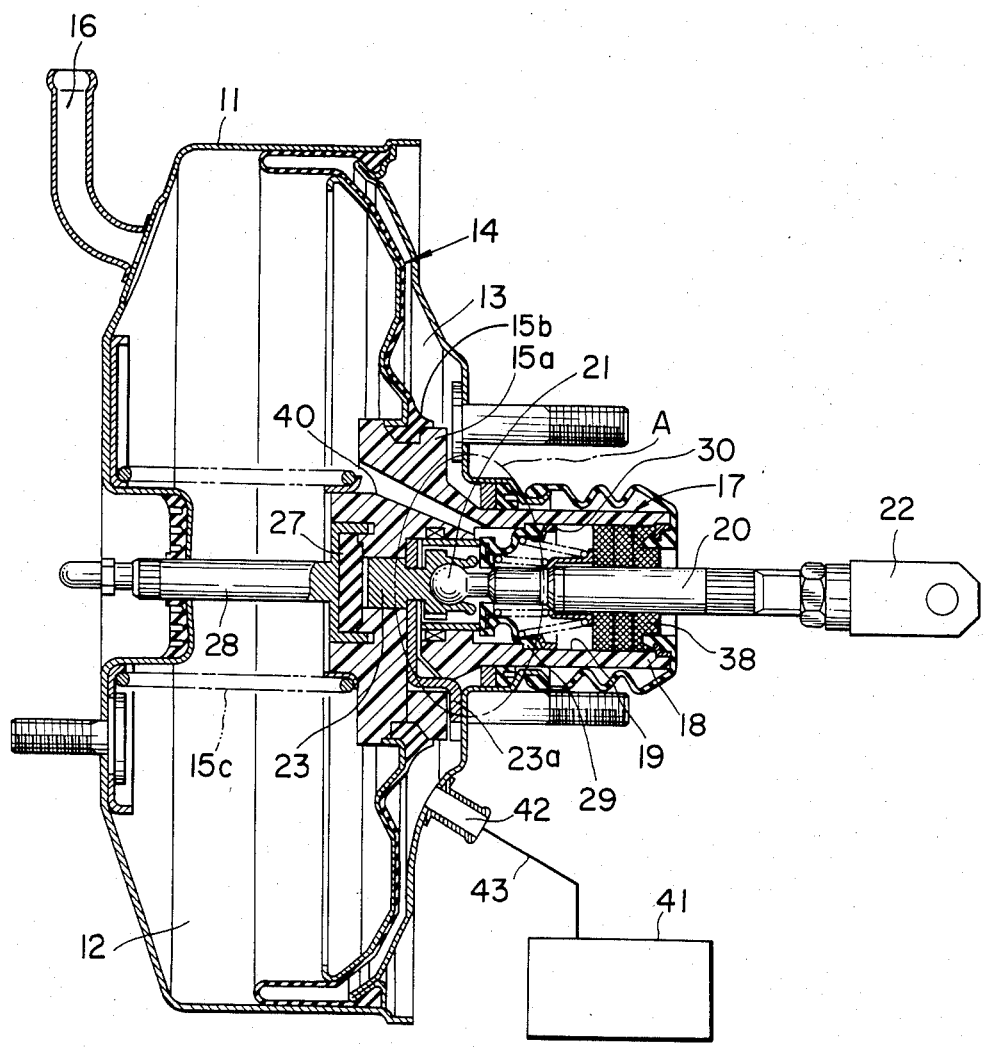
FIG. 2 is a section through a brake booster of a first embodiment of the present invention.
Figure 3:
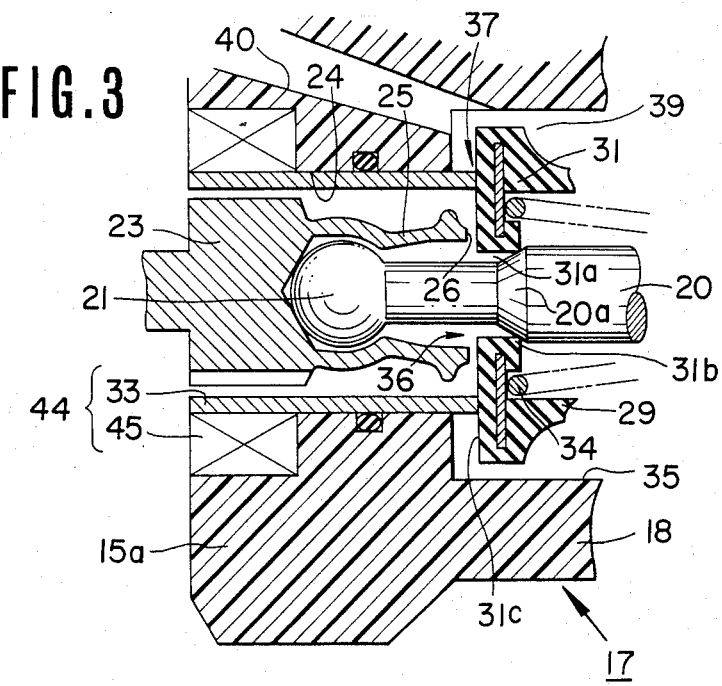
FIG. 3 is an enlarged view of the encircled part A of FIG. 2 showing the booster converter holding an air valve and a vacuum valve in their closed positions.
Figure 4:
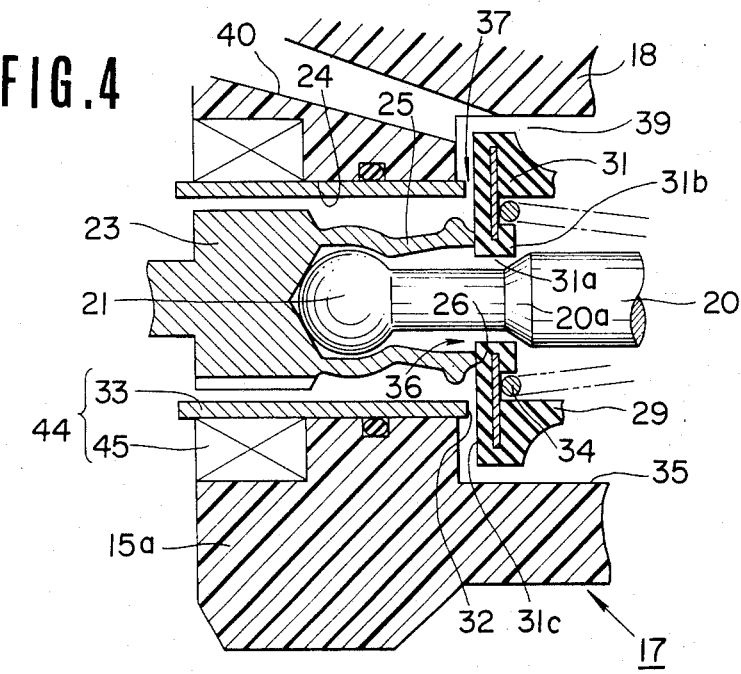
FIG. 4 is a view similar to FIG. 3, but showing the booster converter holding the air valve in its normal, closed position and the vacuum valve in its normal, open position.

FIGS. 2 through 4 illustrate a brake booster of the first embodiment of the present invention. The interior of an air tight housing or a power cylinder 11 is divided into a first reference pressure chamber 12 (the left-hand side as viewed in FIG. 2) and a second working pressure chamber 13 (the right-hand side as viewed in FIG. 2) by a pressure-differential responsive movable wall 14 comprising a power piston 15a and an annular diaphragm 15b integrally fixed to the power piston 15a and the inner wall of the power cylinder 11. The power piston 15a is urged rearward, i.e., toward the working pressure chamber 13 by a piston returning spring 15c.

The reference pressure chamber 12 communicates with a source of negative pressure in the automotive vehicle, e.g., the intake manifold, via an inlet 16 and a check valve (not shown). Thus, the fluid pressure in the chamber 12 becomes an essentially constant negative pressure soon after starting the engine.

The brake booster includes a poppet-type valve arrangement, indicated generally by the reference numeral 17, which includes a generally cylindrical valve body 18 having an internal bore 19 which extends axially of the power cylinder 11 and ends in a blind bore 24 of smaller diameter.

An input rod 20 extends axially through the internal bore 19. The front end of the input rod 20 is formed into a ball 21. A tapered step 20a is formed near the ball 21. The rear end 22 of the input rod 20 is connected to a brake pedal lever, as diagrammed in FIG. 1.

A valve plunger 23 disposed in the blind bore 24 can move through a very short stroke along the axis of the power cylinder 11. The rear end of the valve plunger 23 defines a ball socket 25 receiving the ball 21. Forward movement of the valve plunger 23 is transmitted to the power piston 15a by means of a valve plunger stop key 23a fixedly inserted into the power piston 15a and rearward movement is directly transmitted to the input rod 20. The rear edge 26 of the ball socket 25 serves as an air valve seat, as will be described in greater detail later.

A reaction disc 27 made of a resilient material and fixed at the blind end of bore 24 of the power piston 15a, opposes the forward end of the valve plunger 23 and comes into contact therewith during braking, so as to transfer the reactive force of braking to the input rod 20, and separates therefrom by a very short distance after the brakes are released.

The rear end of an output rod 28 abuts the opposing front surface of the reaction disc 27. The front end of the output rod 28 is rigidly connected to the piston of the master brake cylinder, as diagrammed in FIG. 1.

A valve closure member 29 of the poppet-type valve arrangement 17 surrounds the input rod 20 near the forward end of the larger-diameter section 35 of the bore 19. Its rear edge 30 is clamped to the inner wall of the cylindrical valve body 18. Its forward, radially inward section 31 is urged forward by a valve return spring 34 and has a central aperture 31a through which the section of input rod 20 between the ball 21 and the step 20i a passes. The rear edge 31b of the aperture 31a cooperates with the tapered step 20a of the input rod 20 so as to function as a valve seat of an air valve 36. The front surface 31c of the front section 31 cooperates with the rearmost edge 26 of the ball socket 25 so as to function as a second valve seat of the air valve 36 and with the edge 32 of a cylindrical body 33 of a booster converter 44 lining the blind bore 14 so as to function as a valve body of a vacuum valve 37.

An air filter 38 surrounds the input rod 20 in the extreme rearward end of the bore 19.

The region 39 of the larger-diameter section 35 sealed from the outside by the valve closure member 29 communicates with the reference pressure chamber 12 by way of a vacuum channel 40 bored through the power piston 15a.

The air valve 36 establishes and interrupts communication between the working pressure chamber 13 and atmosphere. The vacuum valve 37 establishes and interrupts communication between the pressure chambers 12 and 13 by way of the region 39 and blind bore 24.

The working pressure chamber 13 receives a fluid at a controlled pressure from an electro-mechanical fluid pressure supply means 41 by way of an inlet 42 and connecting conduit 43. The fluid pressure supply means 41, which includes a fluid pressure source (not shown) and a pressure converter (not shown) or a pressure adjuster (not shown), supplies the fluid at a controlled pressure under the control of an electrical signal. The controlled pressure may be derived from atmospheric pressure or a positive pressure.

The booster converter 44 comprises a cylindrical, magnetized booster converter body 33 slidable along of the walls of the blind bore 24, and a solenoid 45 surrounding the booster converter body 33 in the power piston 15a. A controlling signal for the solenoid 45 can be supplied manually or automatically. In case of the automation, the solenoid 45 is disabled in response to a trouble signal indicating some malfunction of the fluid pressure supply means 41. The booster converter 44, actuated in an ON-OFF manner by the solenoid 45 and a return spring (not shown), either holds both the air and vacuum valves 36 and 37 of the poppet-type valve arrangement 17 in their closed positions, specifically when the brake booster is to be used in the positive-pressure mode, or holds the air valve 36 in its closed position and on the other hand holds the vacuum valve 37 in its open position while the brake pedal is released and vice versa when the brake pedal is depressed when the brake booster is to be used in the vacuum-pressure mode.

The operation of the above-described brake booster will be described first in the case of the positive-pressure mode. The solenoid 45 is energized in response to an ON-signal to urge the booster converter body 33 rearward, so that the edge 32 of the booster converter body 33 abuts the front surface 31c of the valve closure member 29. Thus, the vacuum valve 37, as shown in FIG. 3, interrupts communication between the reference and working pressure chambers 12 and 13. At the same time, the front surface 31c of the valve closure member 29 separates from the rear edge 26 of the ball socket 25 and the rear edge 31b of the aperture 31a abuts the tapered step 20a of the input rod 20. Thus, the air valve 36 almost maintains closed, so as to interrupt communication between the working pressure chamber 13 and atmosphere. In this state, the fluid pressure in the working pressure chamber 13 is under the control of the fluid pressure supply means 41. The operator can obtain a desired braking force by adjusting the signal controlling the fluid pressure supply means 41.

If any device in the system for supplying fluid pressure to the working pressure chamber 13 should malfunction, the solenoid 45 is disabled by a manually or automatically supplied OFF-signal, allowing the booster converter body 33 to return to its forward position, so that the edge 32 of the booster converter body 33 separates from the front surface 31c of the valve closure member 29. Thus, when the brakes are released, the vacuum valve 37, as shown in FIG. 4, establishes communication between the reference and working pressure chambers 12 and 13. At the same time, due to the force of the valve return spring 34 the front surface 31c of the valve closure member 29 abuts the rear edge 26 of the ball socket 25 while the rear edge 31b of the aperture 31a separates from the tapered step 20a of the input rod 20. As described below with reference to the vacuum mode of operation, when the brake pedal is depressed, the air valve 36 is opened, allowing the brake booster to function as a commonly known vacuum-type brake booster.

Secondly, the operation of the brake booster of this invention will be hereinafter described in the case of the vacuum mode. The vacuum valve 37 is open while the brake pedal is released, as shown in FIG. 4, since the solenoid 45 is disabled in vacuum mode. When the operator depresses the brake pedal, the input rod 20, the valve plunger 23 and the front section 31 of the valve closure member 29 move forward without closing the atmosphere flow passage between the aperture rear edge 31b and the tapered step 20a, until the section 31 seals the vacuum valve 37. As the operator continues to depress the brake pedal, thus shifting the valve plunger 23 further forward, the rear edge 26 of the ball socket 25 separates from the front surface 31c of the valve closure member 29 before the tapered step 20a abuts the rear edge 31b of the aperture 31a. Thus, the air valve 36 is opened and admits atmosphere into the working pressure chamber 13, so that a corresponding pressure-differential force between the reference and working fluid pressure chambers 12 and 13 drives the movable wall 14 and the output rod 28 forward. The output rod 28 correspondingly actuates the piston of the master brake cylinder, so that the depression force exerted by the operator effects a corresponding braking force.

In a modification to the embodiment, the booster converter may be designed to be manually actuated, so that the operator can select either of the two operating modes of the brake booster depending on conditions of the automotive vehicle and/or operator's preference etc. In addition, the polarity of the solenoid 45 may be reversed, so that it is to be energized in vacuum mode or in response to pressure loss.

Figure 5:
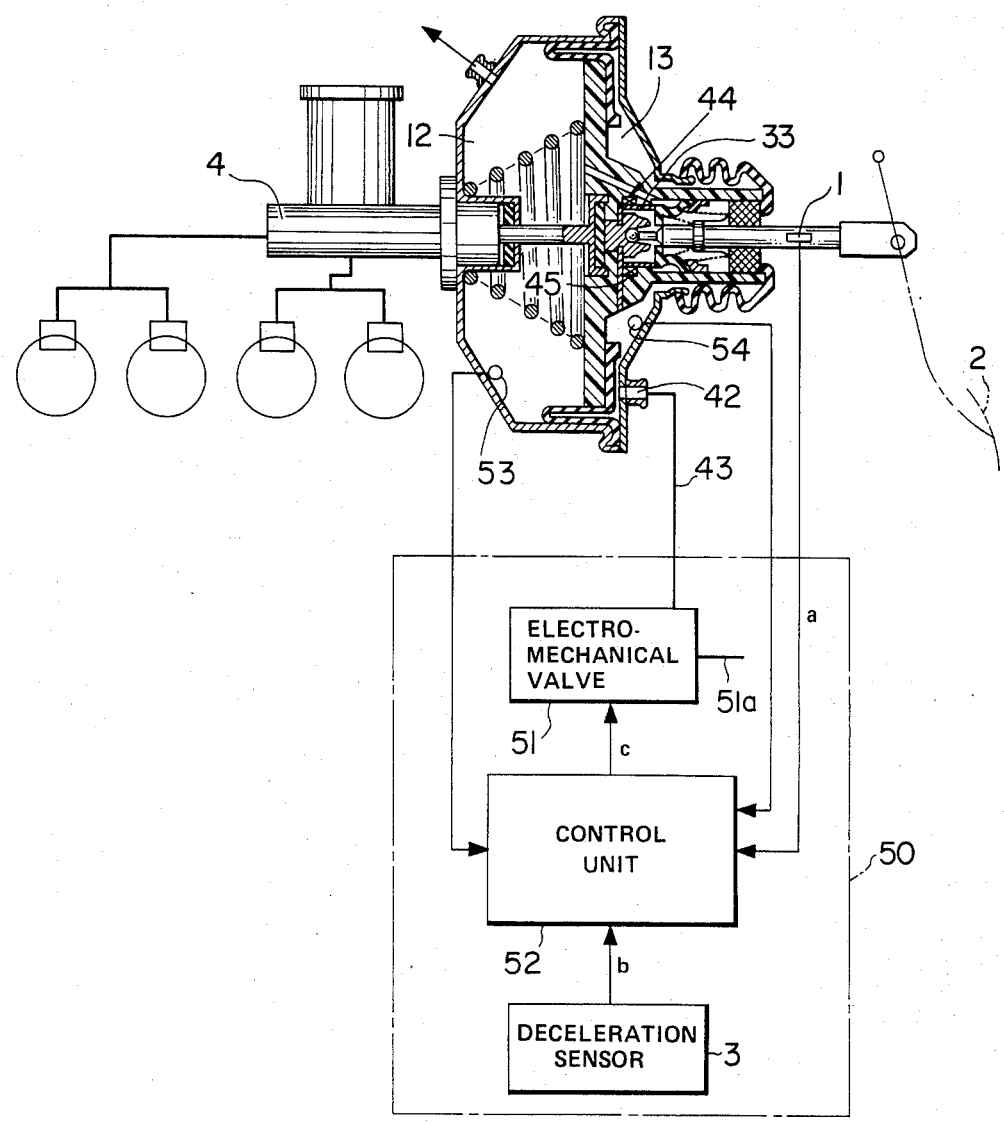
FIG. 5 is a diagrammatic view of a brake system for a vehicle containing a brake booster of a second embodiment of the present invention.

FIG. 5 illustrates a brake booster of the second embodiment of the present invention. Elements similar to those illustrated in FIGS. 1 through 4 will be labeled with the same reference numerals and will not again be described.

Respective reference and working pressure chambers 12 and 13 include pressure sensors 53 and 54 outputting respective pressure sensing signals.

Figure 1:
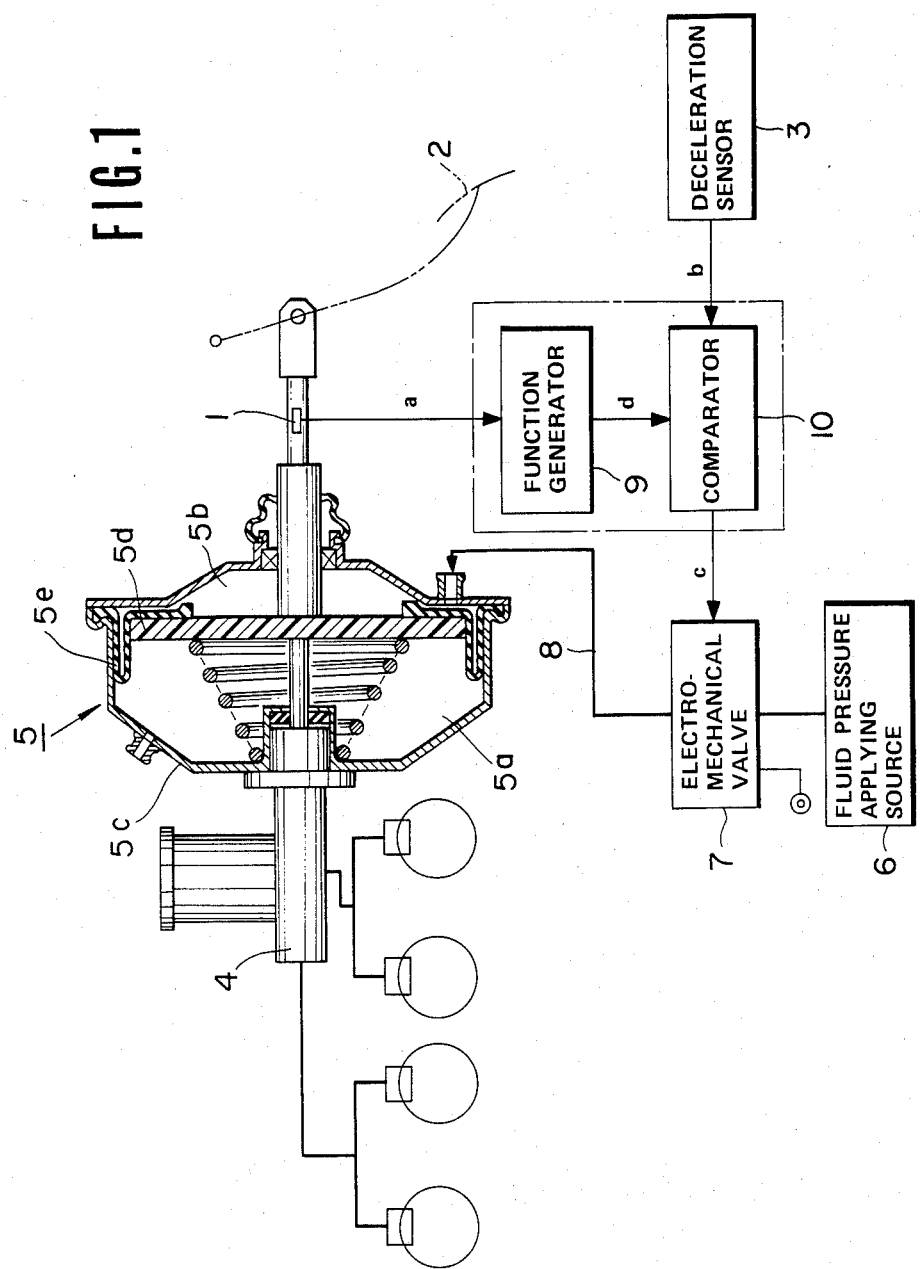
FIG. 1 is a diagrammatic view of an exemplary brake system for an automotive vehicle in which the present invention may be employed.

A signal-controlled fluid pressure supply means 50 comprises an electro-mechanical valve 51, a control unit 52 and a deceleration sensor 3. The electro-mechanical valve 51 has a pressurized air inlet 51a. A signal from the control unit 52 controls the operation of the valve 51. The control unit 52 includes a function generator and a comparator, both as shown in FIG. 1, a check circuit (not shown) detecting any discrepancies in a pedal depression force signal (a), an actual deceleration signal (b) from deceleration sensor 3, the valve-control signal (c), the target deceleration signal (d) from the function generator or the pressure signals from sensors 53, 54 and a solenoid de-energizing circuit (not shown) responding to the trouble signal (e.g., indicating malfunction of devices or electrical disconnection of the signal-controlled fluid pressure supplying means) from the check circuit outputting an OFF-signal to disable the solenoid 45, thus allowing the booster converter body 33 to return to its forward position (i.e. as viewed in FIG. 4).

In accordance with the second embodiment, the solenoid 45 is normally energized so as to hold the booster converter body 33 in the position shown in FIG. 3, and on the other hand, automatically de-energized so as to allow the booster converter body 33 to return to the position shown in FIG. 4 if any trouble occurs in the fluid pressure supply means (50).

Thus, the brake booster of the second embodiment of the present invention can automatically switch from a positive-pressure mode employing the signal-controlled fluid pressure supply means 50 to a vacuum mode as commonly used in conventional brake boosters.

The booster converters in both the embodiments can be modified within the scope of the present invention and are not restricted to the illustrated embodiments, provided they can switch operating modes from a positive-pressure mode using a signal-controlled fluid pressure supply means to a conventional vacuum mode and vice versa.

What is claimed is:

1. A brake booster for augmenting the force applied to a brake of a vehicle, comprising:
    an air-tight housing;
    a pressure-differential responsive movable wall dividing the interior of said housing into first and second fluid pressure chambers, said first chamber being held at an essentially constant vacuum air pressure;
    an output rod fixed to said movable wall for applying force to the brake of the vehicle in accordance with its movement;
    first valve means for controlling communication between said second fluid pressure chamber and atmosphere;
    second valve means for controlling communication between said fluid pressure chambers;
    valve actuating means capable of actuating both said valve means in accordance with manual operation of a brake pedal;
    means connected to the interior of the second fluid pressure chamber for supplying fluid at an adjustable pressure; and
    a booster converter continuously holding both of said valve means closed regardless of the valve actuating means in a first mode of operation of the brake booster, whereby the fluid at an adjustable pressure is supplied to the second pressure chamber through said fluid supply means, said booster converter allowing said valve actuating means to open and close said first valve means and close and open said second valve means respectively as the brake pedal is depressed and released in a second mode of operation of the brake booster, whereby atmospheric air is supplied to the second fluid pressure chamber through said first valve means.

2. A brake booster as defined in claim 1, wherein said booster converter includes a movable booster converter body and actuating means for the booster converter body.

3. A brake booster as defined in claim 2, wherein the booster converter body actuating means is a solenoid.

4. A brake booster as defined in claim 2, wherein the booster converter body is in the form of a cylindrical sleeve.

5. A brake booster as defined in claim 4, wherein the booster converter body is disposed within said pressure-differential responsive movable wall.

6. A brake booster as defined in claim 5, wherein said valve actuating means includes a valve plunger surrounded by the booster converter body and abutting said pressure-differential responsive movable wall, and an input rod joined to and transmitting the force of depression of the brake pedal to the valve plunger.

7. A brake booster as defined in claim 6, wherein both said valve means include a common valve closure member cooperating with an edge of the booster converter body, an edge of the valve plunger and a section of the input rod.

8. A brake booster as defined in claim 1, wherein said fluid pressure supply means includes an electro-mechanical valve supplying fluid at a desired pressure to the second fluid pressure chamber.

9. A brake booster as defined in claim 8, wherein the electro-mechanical valve supplies atmospheric air as the pressurized fluid.

10. A brake booster as defined in claim 3, wherein said fluid pressure supplying means includes a control unit containing a solenoid-control circuit which, when receiving a trouble signal indicating malfunction of said fluid pressure supply means, outputs a signal controlling the solenoid such that the booster converter is switched to its second mode of operation.

* * * * *